(12) United States Patent
Hewitt et al.

(10) Patent No.: US 6,271,036 B1
(45) Date of Patent: Aug. 7, 2001

(54) METHOD FOR EVALUATING CYTOPATHOLOGY SPECIMENS

(75) Inventors: Charles W. Hewitt, Marlton, NJ (US); Rajen Ramsamooj, Sacramento, CA (US); Edward John Doolin, Westmount, NJ (US)

(73) Assignee: University of Medicine & Dentistry of New Jersey, New Brunswick, NJ (US)

( * ) Notice: Subject to any disclaimer, the term of this patent is extended or adjusted under 35 U.S.C. 154(b) by 0 days.

(21) Appl. No.: 09/104,133

(22) Filed: Jun. 24, 1998

Related U.S. Application Data
(60) Provisional application No. 60/052,688, filed on Jul. 16, 1997.

(51) Int. Cl.⁷ .................................................. G01N 33/48
(52) U.S. Cl. ............................. 436/63; 436/64; 382/128; 382/133; 382/134
(58) Field of Search ................................. 435/7.21, 7.23; 359/385, 389, 390, 398; 382/128, 133, 134; 436/64, 63

(56) References Cited

U.S. PATENT DOCUMENTS

| | | | | |
|---|---|---|---|---|
| 5,345,333 | * | 9/1994 | Greenberg | 359/389 |
| 5,740,270 | * | 4/1998 | Rutenberg et al. | 382/133 |
| 5,889,880 | * | 3/1999 | Doerrer et al. | 382/128 |
| 5,939,278 | * | 8/1999 | Boon et al. | 435/7.23 |

\* cited by examiner

*Primary Examiner*—Jill Warden
*Assistant Examiner*—Dwayne K. Handy
(74) *Attorney, Agent, or Firm*—Klauber & Jackson

(57) ABSTRACT

Cytopathology specimens such as cervical Pap smears, are evaluated using oblique illumination of the specimens (preferably by multiple beams) rather than the axial illumination of standard compound microscopes. The result is improved visualization of the specimens, increased light penetration through the specimens, increased depth of field and enhanced contrast and resolution.

9 Claims, 3 Drawing Sheets

Pap Smear (Left Image X 400)  Pap Smear (Right Image X 400)

Pap Smear (Axial Image X 400)

METHOD FOR EVALUATING CYTOPATHOLOGY SPECIMENS

CROSS REFERENCES TO RELATED APPLICATIONS

This application claims the benefit of U.S. Provisional Application 60/052,688 filed Jul. 16, 1997 which is incorporated herein by reference.

FIELD OF THE INVENTION

This invention relates to an improved method for evaluating cytopathology specimens such as cervical Pap smears and fine needle aspirates. The method is particularly useful for evaluating specimens containing thick clusters of cells.

BACKGROUND OF THE INVENTION

The proper evaluation of cytological specimens, such as Pap smears, is of high importance to public health. Cancer of the uterine cervix is the sixth most common malignancy among women. The Pap smear test, introduced by Papanicolaou and Traut in 1943, provides a painless and inexpensive cytological screening method for the early detection of cervical cancer. While this screening test has decreased the mortality associated with cervical cancer by preventing the development of invasive disease, it is nonetheless dependent on the ability of a technician viewing a specimen under a microscope to detect abnormal cells and structures in thick clusters of cells. Success depends in part on the images presented for evaluation. When the image is viewed through a microscope, the thickness and complexity of the specimen, the nature and concentration of the stain, the microscope objective and the light source all influence what is seen.

The conventional evaluation of PAP smears using standard compound microscopes has a number of shortcomings. PAP smears often contain clusters of cells, but the standard compound microscope using axial illumination is particularly ill-suited for clusters of cells. Thick or overlapping images can be distorted because of diffraction of the light and because of absorption by thick sections. Moreover depth of focus is greatly reduced at high power, and it is difficult to visualize structures above or beyond a thin focal plane. Evaluation is made difficult by deficiencies in resolution, contrast, light penetration and sharpness of image.

As a consequence of the difficult and subjective nature of the test, there is a continuing problem with false negative readings and ambiguous readings called "atypical squamous cells of undetermined significance" (ASCUS). False negative readings can occur 5% to 40% of the time, and are 24 times more likely to occur in samples containing fewer than 50 abnormal cells. Pap smear specimens diagnosed as containing ASCUS occur in 1.6%–9% of all specimens. They are significant because 31% of all ASCUS Pap smears will convert to positive readings within six months. Thick cell clusters, scant cellular number and excessive demands on cytopathologists operating with difficult equipment may account for these shortcomings.

Efforts have been made to develop new methods to replace or enhance the efficiency of Pap smear analysis. These efforts include human papilloma virus screening, automated or semi-automated screening by machine (PAPNET), thin preps and the Bethesda system for classifying smears. Unfortunately, to date none of these methods have been shown to adequately enhance the evaluation of Pap smear specimens.

SUMMARY OF THE INVENTION

In accordance with the invention, cytopathology specimens such as cervical Pap smears, are evaluated using oblique illumination of the specimens (preferably by multiple beams) rather than the axial illumination of standard compound microscopes. The result is improved visualization of the specimens, increased light penetration through the specimens, increased depth of field and enhanced contrast and resolution.

BRIEF DESCRIPTION OF THE DRAWINGS

The advantages, nature and various additional features of the invention will appear more fully upon consideration of the illustrated embodiments now to be described in detail in connection with the accompanying drawings. In the drawings.

It is to be understood that these drawings are for purposes of illustrating the concepts of the invention and, except for the histograms, are not to scale.

DETAILED DESCRIPTION

Figure 1:
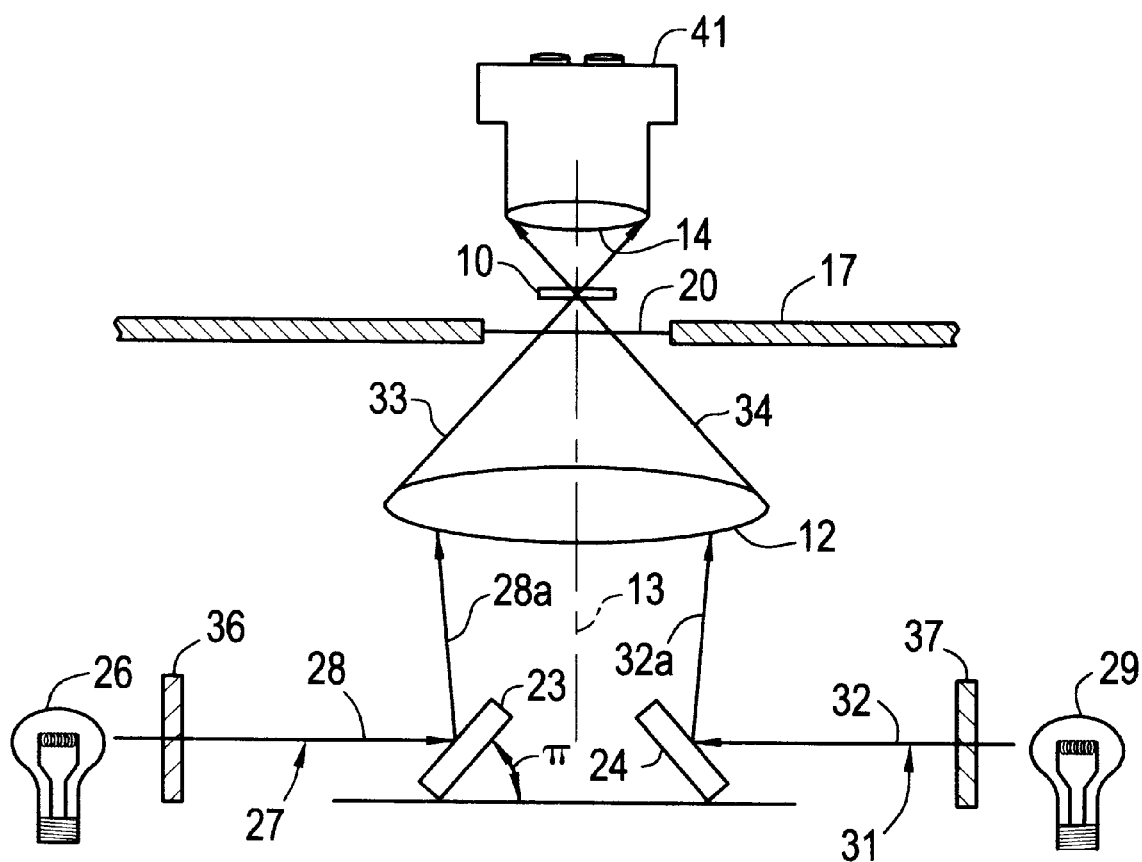
FIG. 1 is a schematic illustration of a cytopathology specimen positioned for receiving multiple-beam oblique illumination.

Referring to the drawings, FIG. 1 schematically illustrates a cytopathology specimen 10 (mounted on a slide) positioned in an optical system for oblique illumination. In the illustrative optical system, which uses multiple oblique beams, a plurality of beam path shifters such as mirrors 23 and 24 are disposed off the optical axis 13 of condenser 12 to permit the system to operate with plural independent illuminating beams to the condenser lens. A first light source 26 directs a light beam 27 along a first beam path 28 that includes mirror 23. Similarly, a second light source 29 directs a second light beam 31 along a second beam path 32 which includes mirror 24. Mirror 23 shifts the direction of beam path 28 to path 28a passing through condenser 12. Mirror 23 is disposed a distance radially away from condenser axis 13 and at an angle $\pi$ relative to the incident right beam 27 which produces the exit beam path 33 from condenser 12 to emerge from the edge of the lens at the maximum angle which includes the objective 14. Similarly, mirror 24 shifts the direction of beam path 32 to path 32a which includes the condenser 12. Mirror 24 operates in precisely the same way as mirror 23 to produce the desired exit beam path 34 from condenser 12. Specimen 10, which can include clusters of cells or other structures, is disposed at the intersection of the oblique beams 33 and 34. The beams projecting through the specimen enter the objective 14 and the specimen can be visualized, as by binocular eyepiece 41.

It can thus be seen that by oblique illumination is meant illumination by a beam making an oblique angle with the objective optical axis, which beam enters the objective lens. Preferably the beam is at the maximum angle to the objective axis that permits the illumination to enter the objective.

While two oblique illumination beams are shown, an improvement over axial illumination is shown by even only a single oblique beam. However, resolution over the entire specimen plane is improved by increasing the number of beams to three or even up to six. The beams are angularly distributed about the axis 13, preferably in an equiangular distribution. Visualization can be further enhanced by the use of polarized beams and polarization filters at the eyepieces to produce a 3D effect. Such illumination systems are described in greater detail in U.S. Pat. No. 5,345,333 which is incorporated herein by reference. Microscopes employing oblique illumination are commercially available from Edge Scientific Instrument Company LLC, Santa Monica, Calif. Single beam oblique illumination can also be achieved by rotation of the stage in an axially illuminated microscope.

To test the characteristics of specimen images produced by oblique illumination, applicants analyzed cervical Pap smears and a standard micrometer using both an oblique illumination microscope (Edge Scientific steroscopic viewing R-400 microscope) and a standard axially illuminated microscope (Mikon Labophot). The same plan apo objectives (Nikon) and a 1.4 NA Condenser were utilized in both experiments. Specimens were of variable thickness ranging from a few cells to 60 micrometers. They were analyzed in focus and out of focus by 8 and 40 micrometers. All fields were captured to a remote computer using a high resolution video camera system (Leaf). The images were thus digitally captured for measurement of various parameters.

Subjectively, it was apparent that multiple oblique illumination provided dramatic capabilities for penetrating thick cell clusters of cytopathology specimens and assessing individual cellular detail within clusters. Microscopic observation of thick cell clusters proved difficult using conventional axial illumination, as interpretation within the flat field was suboptimal. Multiple oblique illumination provided a number of advantages, including increased intensity of light penetration through a wide range of focal planes within the clusters.

Figure 2A:
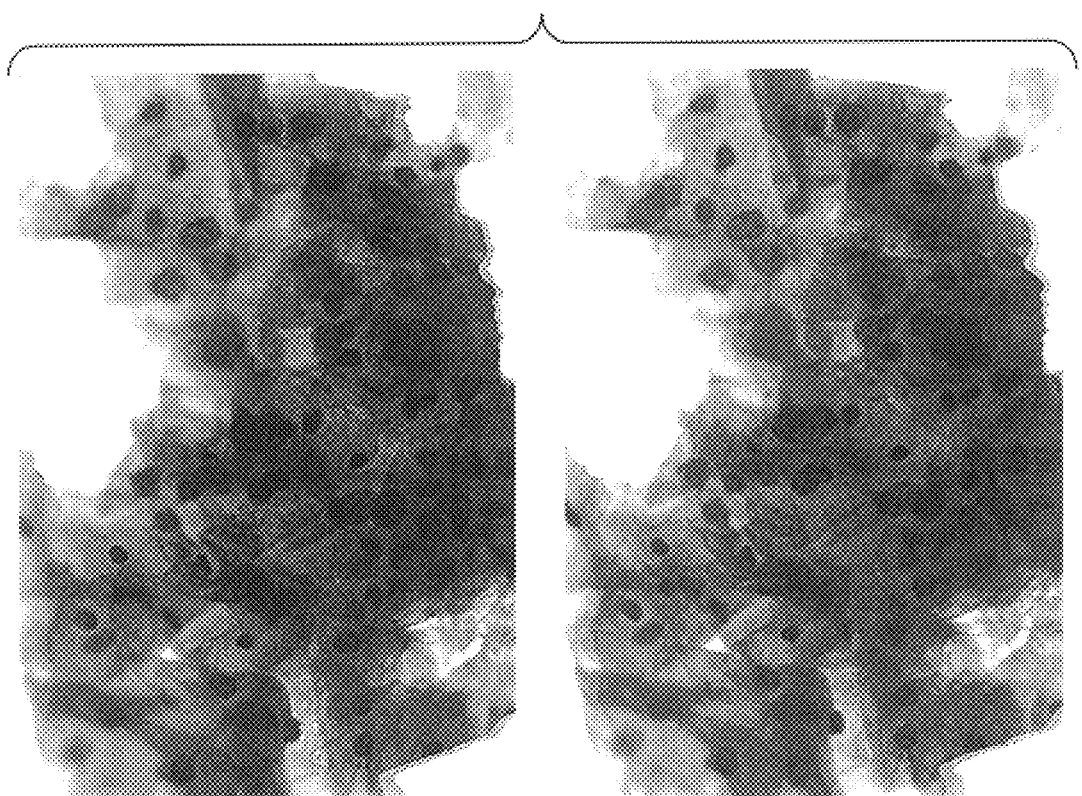
FIGS. 2A and 2B are printouts of digitally captured images illustrating visualization of a region within a thick cell cluster using the arrangement of FIG. 1 and using conventional axial illumination, respectively.

The two images shown in FIG. 2A are stereo images (×400) digitally captured using multiple oblique illumination of a Pap smear in an R-400 microscope. People experienced with stereo images can visualize a 3-D picture by focusing through both images of FIG. 2A. The depth of field demonstrates several atypical nuclei characteristic of moderate dysplasia.

Figure 2B:
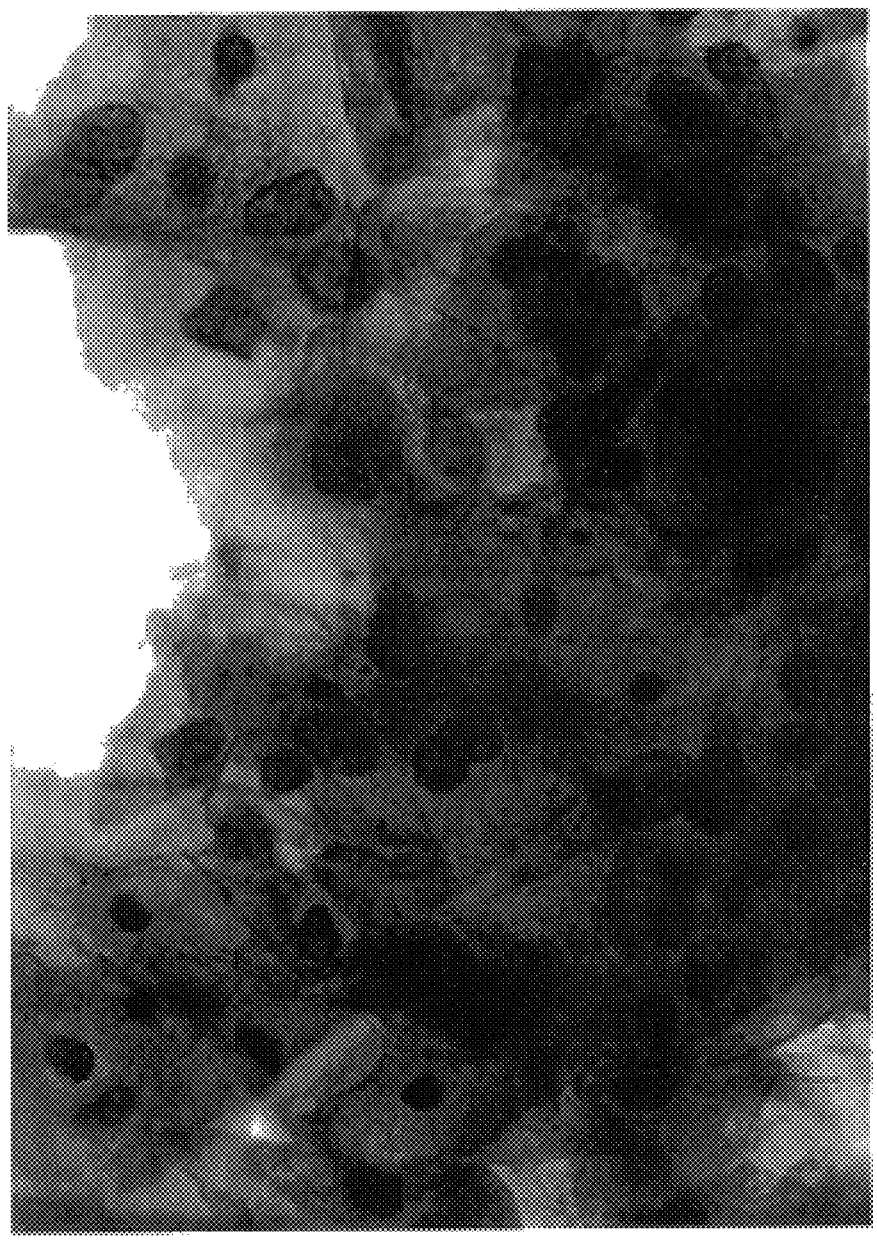

The image shown in FIG. 2B is an image (×400) digitally captured using axial illumination of a Pap smear in a Nikon Optiphot microscope. The narrow depth of field obscures several atypical nuclei in the thick cell cluster. This is the same cell cluster as in FIG. 2A, and the atypical cells seen by multiple oblique illumination and stereo 3D imaging are not apparent with axial illumination.

To quantify the observed increases in intensity, Gray scale histograms were constructed for each image using Mocha Image Analysis software available from Jandel Scientific. These histograms are graphic representations of frequency distributions in which the x-axis represents the intensity I (0–255) and the y-axis represents the number of pixels at a given intensity. Since the images were black and white, the peaks in the histogram indicate the properties of the image. Narrow peaks indicate good resolution (well focused) and widely split peaks indicate good contrast (greater difference between black and white).

As a figure of merit, $K_f=\Sigma(|I_m-I_n|\times N)$ was calculated where $I_m$ is the medium pixel intensity, $I_n$ is the measured pixel intensity and N is the number of pixels at $I_n$. A larger $K_f$ value indicates increased contrast and resolution.

The results were that for multiple oblique illumination, the overall mean light intensities at all focal planes tested were significantly greater (20%) as compared to a standard microscope. At the midpoint plane of focus (20 micrometers), oblique illumination produced a 26% greater mean intensity. $K_f$ values were computed as follows:

|  | Oblique | Standard |
| --- | --- | --- |
| In focus | $4.01 \times 10^7$ | $3.91 \times 10^7$ |
| 8 µm out of focus | $2.32 \times 10^7$ | $1.75 \times 10^7$ |
| 40 µm out of focus | $2.01 \times 10^7$ | $1.65 \times 10^7$ |

Additional details of this testing are set forth in the above-identified Provisional Application Ser. No. 60/052,688 which is incorporated herein by reference.

Thus the use of oblique illumination in the evaluation of cytopathology specimens including thick clusters of cells increases the depth of focus, improves the resolution of cells or structures that overlap, and increases the contrast of small objects. This provides significant advantages in the evaluation of the specimens and has the potential to reduce the number of false negative and ambiguous readings in Pap smear tests.

The invention will now be more concretely illustrated by the following specific examples.

EXAMPLE 1

A cervical Pap smear is obtained using a cervical spatula and an endocervical brush. The specimen is then transferred onto a glass slide and smeared using another glass slide. Several such slides are made by smearing and stained with Papanicolaou stain.

After staining, a slide is secured within the stage of a multiple oblique illumination microscope. The slide is scanned from one end to another in a back-and-forth manner using overlapping fields so that the entire slide is microscopically evaluated. Slides are first scanned with a 10× objective and abnormal cells are evaluated at higher magnification (i.e. 20×, 40×, 100×). Any objectives can be used, but planes and depths of field are examined by continuously focusing to define cellular detail.

Several cervical Pap smears of were evaluated using the Edge R-400 microscope. The thick areas of cellular detail could be visualized. Dysplastic cells were in fact present in the thick areas of the specimens and had not been initially detected with a standard microscope due to poor depth of field and difficulty of visualizing cells in the thick clusters. The dysplastic nature was confirmed by biopsy correlation.

Additional information concerning related evaluations is set forth in the above identified Provisional Application Ser. No. 60/052,688.

EXAMPLE 2

A cytological specimen is obtained by suction through a 23 to 25 gauge needle and a 5 cc syringe using a standard aspiration gun. The aspirated tissue is then expelled onto a glass slide and smeared using another. Several slides are prepared by smearing and staining with Wright's stain, Diff-Quik stain or Papanicolaou stain depending on the tissue being examined. (Other dyes or fluorescent markers can similarly be used.) The specimen are then evaluated as in Example 1.

Several random fine needle aspirates of the thyroid were also evaluated using the Edge R-400. Visualization of cellular aggregates with abundant amounts of colloid and/or bloody aspirates was enhanced. The important parameters of nuclear area, nuclear perimeter and maximum nuclear diameter could easily be determined.

Additional information concerning related evaluations is set forth in the above-identified Provisional Application Ser. No. 60/052,688.

EXAMPLE 3

Cervical Pap smears obtained and prepared in accordance with Example 1 were visualized with multiple-beam oblique illumination, both in focus and 10 microns out of focus. Single cell images were digitally captured to a remote computer and analyzed using Image Pro image analysis software. Each cell was measured for its area and perimeter utilizing edge detection in selected regions of 800× magnified digital images.

EXAMPLE 4

3-D digital image processing was used to compare the cellular detail in cervical epithelial cellular data sets. Multiple oblique illumination was tested at various oblique angles. Images were captured sequentially (z=0.5 $\mu$m) on the Edge R-400 high definition 3-D microscope using a Leaf Lumina camera at high resolution (1278×852 pixels). Images were processed by a standardized look-up table for optimal contrast and brightness (Image Pro Plus, Media Cybernetics). Oblique angles in the microscope were set at the default (0), −3, and +1.5 calibrations. 3-D data sets were compiled using Voxblast (VayTek) with an intrinsic lighting model. Cellular detail was determined by analyzing the number of discrete intracellular objects at a standard threshold setting (Mocha, Jandel). Differences were considered significant, if $p<0.05$ as determined by repeated measures analysis of variance or the Student's T test.

Computer generated 3-D data sets demonstrated dramatic improvement with respect to cellular detail, as determined by the number of objects thresholded within the epithelial cells, by changing the angle of multiple oblique illumination (MOI angle). Significantly improved cellular detail was obtained using a MOI angle of −3 vs. 0 or +1.5 ($p<0.003$).

| MOI ANGLE | N | # OF THRESHOLD OBJECTS MEAN ± SD | P |
|---|---|---|---|
| 0 | 3 | 58.3 ± 9.2 | — |
| +1.5 | 3 | 74.0 ± 23.9 | p < 0.05 |
| −3 | 3 | 212 ± 54.8 | p < 0.003 |

Additionally, as a measure of sharpness and contrast, perimeter measurements were made for the 0 and −3 MOI angle data sets. The number of pixels representing the perimeter of the epithelial cells were 1145.9±65.5 and 1035.6±6.03, respectively ($p<0.05$).

The low angle of obliqueness provided a greater depth of field and contrast. This result was surprising in view of the fact that confocal 3-D reconstructed images are usually considered superior because they rely on ultra-thin planes. The use of oblique illumination and high definition 3-D microscopy provides significant advantages for automated computerized imaging of cytopathology specimens such as Pap smears.

While many of the above examples involve evaluation of specimens including clusters of cells, it was observed that the increased resolution, contrast, sharpness and depth of field from oblique illumination also allowed for enhanced visualization of isolated cells in the specimens.

It is to be understood that the above-described embodiments are illustrative of only a few of the many possible specific embodiments which can represent applications of the principles of the invention. Numerous and varied other methods and arrangements can be made by those skilled in the art without departing from the spirit and scope of the invention.

What is claimed:

1. A method of evaluating a specimen comprising the steps of:

providing a thick cytopathology specimen;

staining said specimen;

disposing said stained thick specimen in an optical system;

obliquely illuminating said thick specimen by one or more light beams to obtain three-dimensional images in order to resolve overlapping structures; and analyzing the three-dimensional images to assess cellular detail within said thick specimen and identify abnormal cells.

2. The method of claim 1 wherein said identification of abnormal cells is by human visual observation.

3. The method of claim 1 further comprising the step of recording the image of said illuminated specimen.

4. The method of claim 3 wherein said identification of abnormal cells is by analysis of said recorded image.

5. The method of claim 1 wherein said specimen is disposed in an optical system having an optical axis and said specimen.

6. The method of claim 3 wherein said image is recorded by digitally capturing said image.

7. The method of claim 6 wherein said identification of abnormal cells is by analysis of said digitally captured image.

8. The method of claim 1 in which the specimen has a thickness of grater than 5 microns.

9. A method of evaluating a cytopathology specimen from a Pap smear comprising the steps of:

providing said cytopathology specimen from a Pap smear consisting of at least one cluster of cells;

staining said specimen;

disposing said stained specimen in an optical system;

obliquely illuminating said specimen by one or more light beams to obtain three-dimensional images in order to resolve overlapping structures; and analyzing the three-dimensional images to assess cellular detail within said specimen and identify abnormal cells.

* * * * *